A. S. Collins, Fish Spawning Screen.

No. 105176

Patented Jul 12 1870

Witnesses:
E. Radtke
L. S. Mabee

Inventor:
A. S. Collins
per Munn & Co
Attorneys.

United States Patent Office.

ALFRED S. COLLINS, OF CALEDONIA, NEW YORK.

Letters Patent No. 105,176, dated July 12, 1870.

IMPROVEMENT IN SPAWNING-SCREEN.

The Schedule referred to in these Letters Patent and making part of the same.

*To all whom it may concern:*

Be it known that I, ALFRED S. COLLINS, of Caledonia, in the county of Livingston and State of New York, have invented a new and useful Improvement in Spawning-Screen; and I do hereby declare that the following is a full, clear, and exact description thereof, which will enable others skilled in the art to make and use the same, reference being had to the accompanying drawing forming part of this specification.

This invention relates to a new and useful improvement in screens or beds for receiving and securing the spawn of fish, in the art of pisciculture, whereby the process is greatly simplified, and the labor diminished; and It consists in the use of a revolving screen, arranged and operating as hereinafter more fully described.

In the accompanying drawing—

Similar letters of reference indicate corresponding parts.

Figure 1:
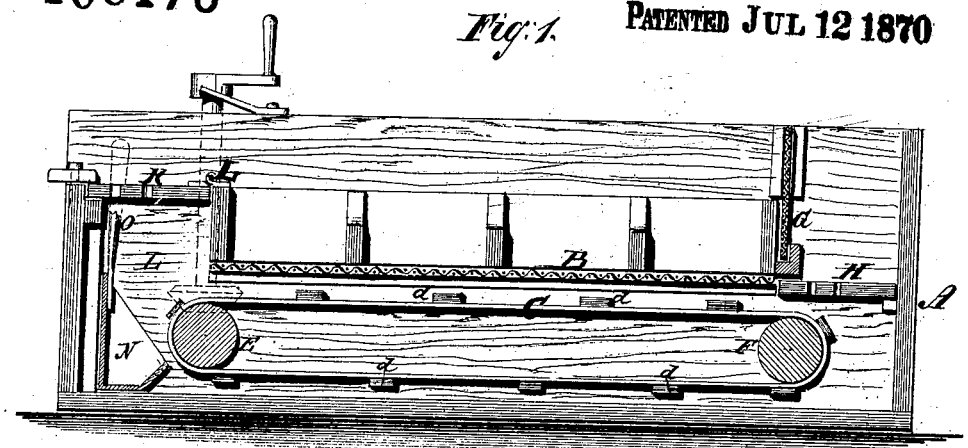
Figure 1 represents a vertical longitudinal section of a spawning-bed or box, constructed according to my invention, the section being through the line $x\ x$ of fig. 2.
Figure 2:
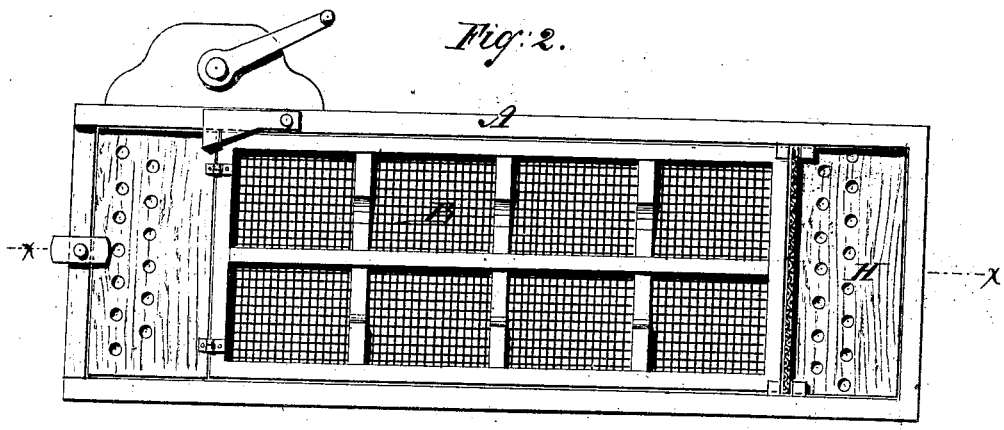
Figure 2 is a top or plan view of the same.

A is the box in which the screens are placed; this box is placed in the raceway of a fish-pond.

B is the upper screen, which is made of wire cloth, which may be either in a single piece or in section.

This screen is covered with gravel to a suitable depth, say two inches, more or less. The current of water is received by this screen, and in the gravel thereon the fish make their nests or lay their spawn.

C represents a finer screen beneath B, made of fine wire cloth, or of any other suitable material, tarred muslin, or mosquito netting will answer the purpose. This under screen is strengthened by means of cross-bars $d$, as seen in the drawing, to prevent sagging, and to keep the screen in place.

This screen forms an endless apron, and is supported on the rollers E and F, and by grooves in the sides. The spawn which has been deposited by the fish on the upper screen will find its way through that screen, and be received by the fine screen beneath.

G and H are permanent screens, to prevent the fish from getting beneath the screens, or into the bottom of the box.

A moderate quantity of water is allowed to pass through the screen H to the bottom of the box. The whole box is covered during the spawning season.

K is a screen, which is hinged, as seen at L. When the spawn is to be secured or taken from the lower screen, this hinged screen K is raised and secured in an upright position. The box being covered, the fish are not disturbed, and with the screen K raised, none of the fish can get into the well L.

N is a narrow trough or box, provided with a handle, O, which is let down in front of the roller E.

The screen C is now revolved by turning the roller E, by means of crank and gearing, as represented, or in any convenient manner. In this manner the spawn is carried from the revolving apron screen into the box N. The gentle current of water which passes over the apron will carry the eggs into the box without injuring them.

When the screens are broad, the trough or box N may be made in sections secured in a suitable frame, and emptied separately. This spawning apparatus is adapted to all the various kinds of fish which spawn in shallow water.

The box and screens may be made of any desired length, width, and depth, so as to adapt them to all circumstances.

By the use of the revolving screen the eggs or spawn may be secured in a few minutes, say, eight or ten, whereas by the ordinary method, it would require a half a day.

By this arrangement, it is not necessary to put the hands in water to secure the spawn; by the old method it is indispensable, which, in the cold water required, is extremely disagreeable, and is not unfrequently attended with more serious results.

The spawn is secured in perfect order and without in any manner disturbing the fish.

Having thus described my invention,

I claim as new and desire to secure by Letters Patent—

The use of a revolving screen, in combination with a fish-spawning box or bed, arranged to operate substantially as and for the purposes described.

A. S. COLLINS.

Witnesses:
    J. McKENZIE,
    E. A. ROE